US012594825B2

(12) United States Patent (10) Patent No.: US 12,594,825 B2
Imai et al. (45) Date of Patent: Apr. 7, 2026

(54) IN-WHEEL MOTOR DRIVING DEVICE

(71) Applicant: TOYOTA JIDOSHA KABUSHIKI KAISHA, Toyota (JP)

(72) Inventors: Keita Imai, Seto (JP); Kiichi Yokoyama, Toyota (JP); Hiroki Monji, Toyota (JP); Yusuke Ueta, Haibara-gun (JP); Tatsuya Sakai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 305 days.

(21) Appl. No.: 18/382,752

(22) Filed: Oct. 23, 2023

(65) Prior Publication Data

US 2024/0217332 A1 Jul. 4, 2024

(30) Foreign Application Priority Data

Dec. 28, 2022 (JP) ................................. 2022-211584

(51) Int. Cl.
*B60K 7/00* (2006.01)
*B60B 27/00* (2006.01)
*B60K 17/04* (2006.01)

(52) U.S. Cl.
CPC ........ *B60K 7/0007* (2013.01); *B60B 27/0073* (2013.01); *B60K 2007/0038* (2013.01); *B60K 2007/0092* (2013.01); *B60K 17/043* (2013.01)

(58) Field of Classification Search
CPC ................... B60K 7/00; B60K 7/0007; B60K 2007/003–0092; B60K 17/043; B60K 17/046; B60L 2220/44; B60L 2220/46
See application file for complete search history.

(56) References Cited

U.S. PATENT DOCUMENTS

| | | | |
|---|---|---|---|
| 7,938,212 B2 * | 5/2011 | Sakuma | B60K 7/0007 |
| | | | 180/65.51 |
| 9,180,771 B2 * | 11/2015 | Yukishima | B60K 17/043 |
| 10,207,576 B2 * | 2/2019 | Makino | B60K 17/046 |
| 10,792,967 B2 * | 10/2020 | Tamura | B60G 7/00 |

FOREIGN PATENT DOCUMENTS

JP 2021-127819 A 9/2021

* cited by examiner

*Primary Examiner* — James J Taylor, II
(74) *Attorney, Agent, or Firm* — Dinsmore & Shohl LLP

(57) ABSTRACT

An in-wheel motor drive device includes: a motor case housing a motor provided in a wheel of a drive wheel; a reduction gear case housing a reduction gear; and a plurality of fastening bolts for fastening the motor case and the reduction gear case. Further, among the plurality of fastening bolts, a pair of fastening bolts facing each other across a stator coil end portion of the motor is arranged on a same straight line in a radial direction orthogonal to an axis direction of the motor.

1 Claim, 4 Drawing Sheets

IN-WHEEL MOTOR DRIVING DEVICE

CROSS-REFERENCE TO RELATED APPLICATION(S)

The present application claims priority to and incorporates by reference the entire contents of Japanese Patent Application No. 2022-211584 filed in Japan on Dec. 28, 2022.

BACKGROUND

The present disclosure relates to an in-wheel motor driving device.

Japanese Laid-open Patent Publication NO. 2021-127819 discloses an in-wheel motor driving apparatus for fastening the motor case and the reduction gear case with bolts. In the in-wheel motor driving device disclosed in Japanese Laid-open Patent Publication NO. 2021-127819, the second bolt is disposed along the outer periphery of the speed reducer case with the first bolt is disposed inside the motor case. Further, by the sealing material is provided on the outer position of the first bolt and the inner position of the second bolt, to ensure the sealing property at the bolted portion between the motor case and the reduction gear case.

SUMMARY

There is a need for providing an in-wheel motor drive device capable of improving the sealing property.

According to an embodiment, an in-wheel motor drive device includes: a motor case housing a motor provided in a wheel of a drive wheel; a reduction gear case housing a reduction gear for decelerating a rotation of the motor and outputting the decelerated rotation from an output shaft to the drive wheel; and a plurality of fastening bolts for fastening the motor case and the reduction gear case in a state where a mating surface of the motor case and a mating surfaces of the reduction gear case are combined. Further, among the plurality of fastening bolts, a pair of fastening bolts facing each other across a stator coil end portion of the motor is arranged on a same straight line in a radial direction orthogonal to an axis direction of the motor.

DETAILED DESCRIPTION

In the in-wheel motor driving device disclosed in Japanese Laid-open Patent Publication No. 2021-127819, since the bolt fastening interval around the coil end of the motor is large, the motor case and the reducer case when a force in a direction to separate the mating surfaces of each other acts it is difficult to suppress the deformation. Therefore, there was room for improvement in ensuring the sealing between the mating surfaces against the deformation of the motor case and the reducer case.

Hereinafter, an embodiment of an in-wheel motor driving device according to the present disclosure. Note that the present disclosure is not limited by the present embodiment.

Figure 1:
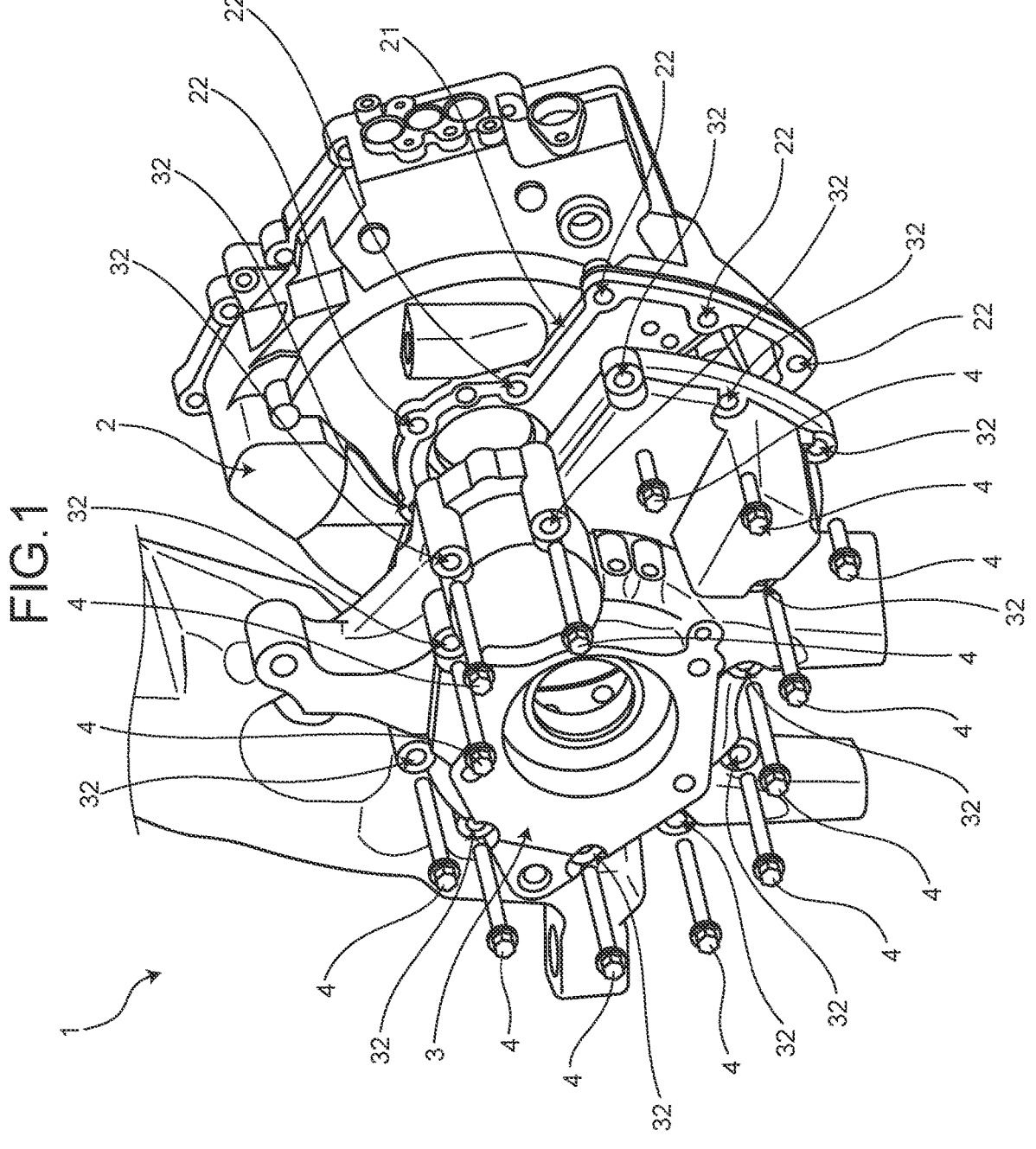
FIG. 1 is a perspective exploded view illustrating a motor case, the speed reducer case, and the fastening bolts of the in-wheel motor driving device according to an embodiment.
Figure 2:
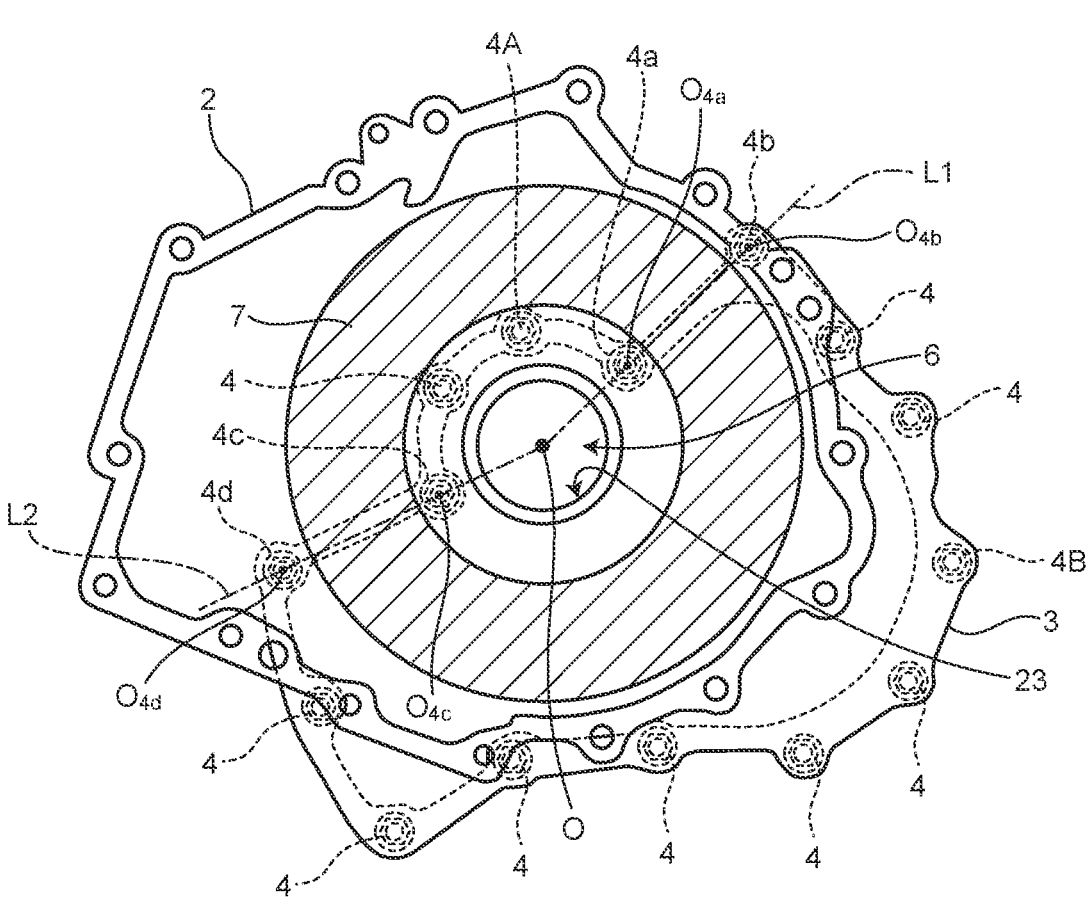
FIG. 2 is a view of the in-wheel motor driving device from an opening surface side of the motor case.
Figure 3:
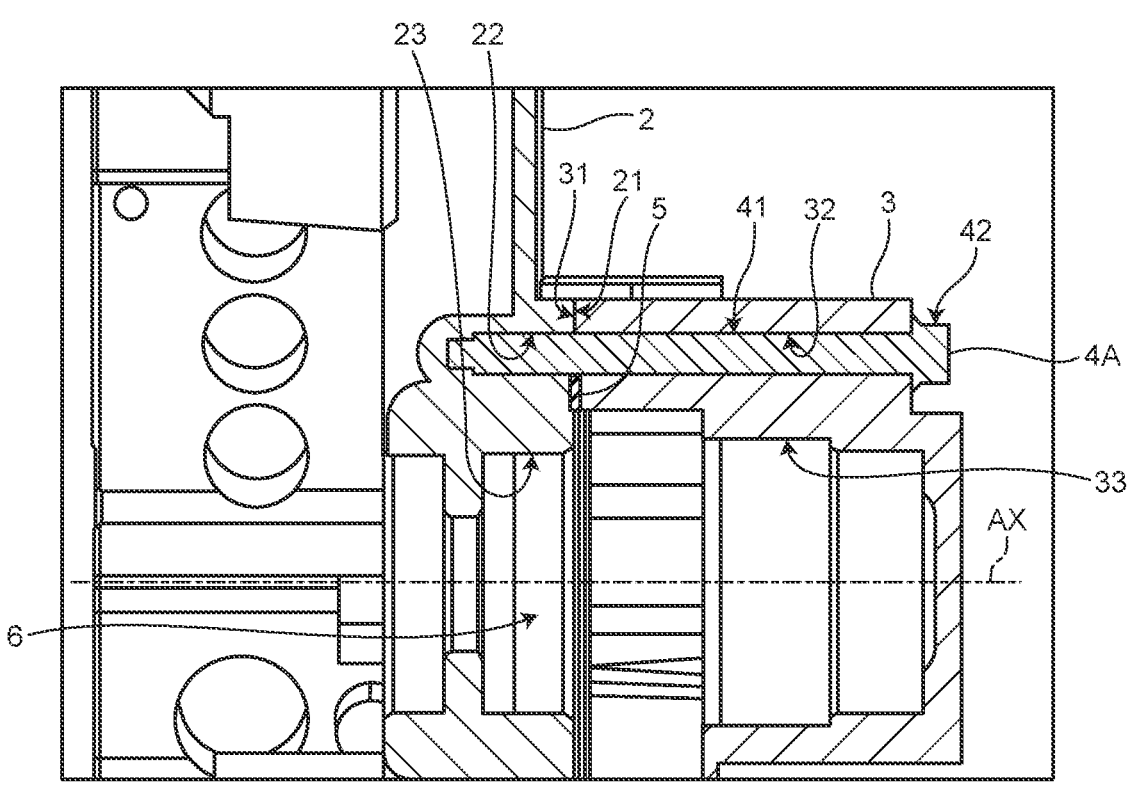
FIG. 3 is a fragmentary cross-sectional view of the vicinity of a fastening bolt located inside a stator coil end in a radial direction of an in-wheel motor.
Figure 4:
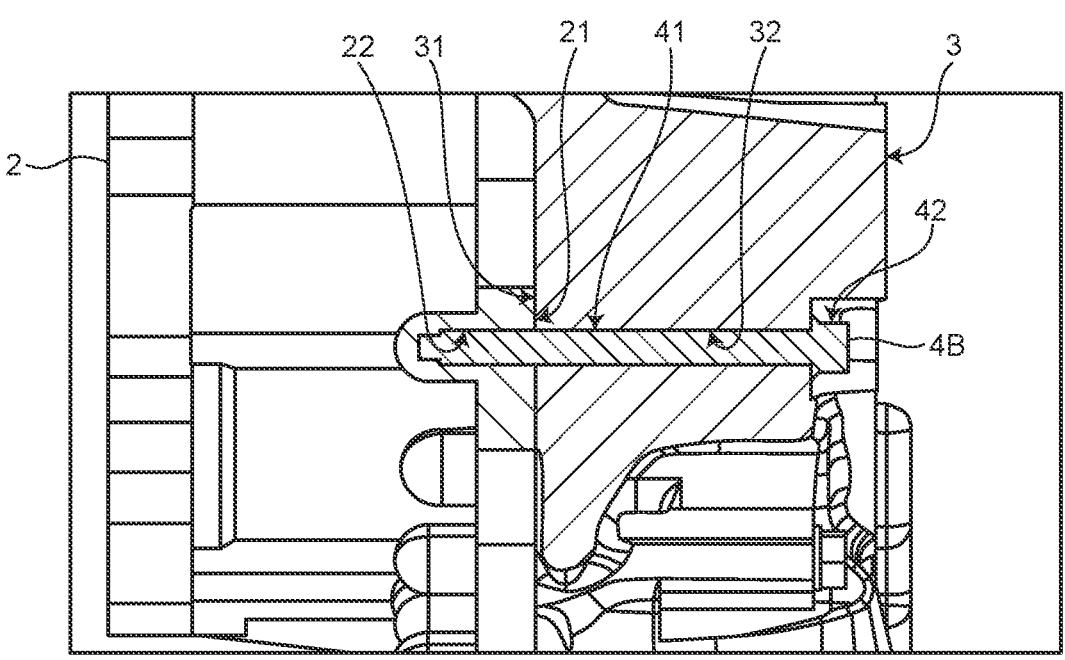
FIG. 4 is a fragmentary cross-sectional view of the vicinity of the fastening bolt located outside a stator coil end in the radial direction of the in-wheel motor.

FIG. 1 is a perspective exploded view illustrating a motor case 2, the reduction gear case 3, and the fastening bolts 4 of the in-wheel motor driving device 1 according to the embodiment. FIG. 2 is a view of the in-wheel motor driving device 1 from the opening surface side of the motor case 2. FIG. 3 is a fragmentary cross-sectional view of the vicinity of the fastening bolt 4A located inside the stator coil end 7 in the radial direction of the in-wheel motor. FIG. 4 is a fragmentary cross-sectional view of the vicinity of the fastening bolt 4B located outward from the stator coil end 7 in the radial direction of the in-wheel motor.

The in-wheel motor driving device 1 according to the embodiment is constituted by a motor case 2 for accommodating the in-wheel motor, and a reduction gear case 3 for accommodating the reduction gear. In the in-wheel motor, the rotor rotary shaft is fixed is an inner rotor type motor provided on the inner peripheral side of the stator, with provided in the wheel of the drive wheel, a drive source for outputting a torque to the drive wheel. The reduction gear is configured to output from the output shaft to the drive wheel by reducing the rotation of the in-wheel motor by a plurality of gears or the like.

With respect to the motor case 2 and the reduction gear case 3, in a state of combining the mating surface 21 provided on the motor case 2 and the mating surface 31 provided on the reduction gear case 3, it is fastened by a plurality of fastening bolts 4. A bolt shaft portion 41 of the fastening bolt 4, from the bolt hole 32 side is a through hole provided in the speed reducer case 3, is inserted toward the bolt hole 22 is a bottomed hole provided in the motor case 2, the bolt head 42 of the fastening bolt 4 is engaged with the speed reducer case 3. For example, in FIG. 3, while the bolt hole 32 of the bolt hole 22 and the speed reducer case 3 of the motor case 2 is communicated, the bolt shaft portion 41 of the fastening bolt 4A is inserted toward the bolt hole 22 from the bolt hole 32 side, the bolt head 42 of the fastening bolt 4A is engaged with the speed reducer case 3. Further, in FIG. 4, while the bolt hole 32 of the bolt hole 22 and the speed reducer case 3 of the motor case 2 is communicated, the bolt shaft portion 41 of the fastening bolt 4B is inserted toward the bolt hole 22 from the bolt hole 32 side, the bolt head 42 of the fastening bolt 4A is engaged with the speed reducer case 3.

Thus, the wall portion forming the bolt holes 22 of the motor case 2, to function as a partition wall for separating the inside and the outside of the motor case 2 of the motor case 2, through the portion inserting the fastening bolts 4 from the inside of the motor case 2 oil leakage can be suppressed to occur.

In the in-wheel motor driving device 1 according to the embodiment, as illustrated in FIG. 3, by the bearing portion 33 of the bearing portion 23 and the reduction gear case 3 of the motor case 2 is communicated, the shaft hole portion 6 in which the rotation axis of the in-wheel motor is disposed is formed. Incidentally, "AX" in FIG. 3 indicates the axis of the rotary shaft.

Further, as illustrated in FIG. 2, a plurality of fastening bolts 4, such as fastening bolt 4A, 4a, and 4c, those located inside the stator coil end portion 7 in the radial direction perpendicular to the axial AX direction of the in-wheel motor It is included. Further, the plurality of fastening bolts

4, as in the fastening bolt 4B, 4*b*, and 4*d*, those located outward from the stator coil end portion 7 in the radial is included.

Further, among the plurality of fastening bolts 4, a pair of fastening bolt 4*a* and the fastening bolt 4*b* facing each other across the stator coil end portion 7 in the radial direction are arranged on the same straight line in the radial direction. The center line L1 passing through the axial center O4*a* and the axial center O4*b* of the fastening bolt 4*b* of the fastening bolt 4*a* passes through the axial center O of the rotary shaft in the shaft hole portion 6, the axial center O It extends normal to the concentric circle. Further, among the plurality of fastening bolts 4, a pair of fastening bolt 4*c* and the fastening bolt 4*d* facing each other across the stator coil end portion 7 in the radial direction are arranged on the same straight line in the radial direction. The center line L2 through the axial center O4*c* of the fastening bolt 4*c* and the axial center O4*d* of the fastening bolt 4*d* passes through the axial center O and extends normal to the axial center O concentric circle.

Thus, in the in-wheel motor driving device 1 according to the embodiment, the bolt joint distance between the fastening bolt 4*a* and the fastening bolt 4*b* (shaft center distance), and, the bolt joint distance between the fastening bolt 4*c* and the fastening bolt 4*d* (shaft center distance) can be shortest. Therefore, at the time of load input to the motor case 2 and the speed reducer case 3, to reduce the amount of deformation of the motor case 2 and the speed reducer case 3, by suppressing the force in a direction to separate the mating surfaces 21 and 31 to each other acts, it is possible to improve the sealing property. Furthermore, it is possible to suppress the enlargement of the body size of the in-wheel motor driving device 1.

Then, as illustrated in FIG. 3, in the mating surface 31 of the mating surface 21 and the reduction gear case 3 of the motor case 2, the inner part than the fastening bolt 4A in the radial direction is a direction perpendicular to the axial AX direction of the in-wheel motor sealant 5 is provided is applied. Thus, it is possible to suppress the sealing material 5 is removed by external factors, it is possible to improve the sealing property against external factors other than deformation of the motor case 2 and the reduction gear case 3. The external factors described herein, for example, when the reservoir portion of the sealing material is exposed to the outside, it refers to the assembling worker or contact with the sealing material, sand or water or the like is in contact when the vehicle is running. Further, with the rotation of the rotation shaft of the in-wheel motor, the oil leakage through the gap of the mating surfaces 21 and 31 from the shaft hole portion 6, it is possible to effectively suppress by the sealing material 5.

The above-described configuration is merely an example of an embodiment of the present disclosure, and the present disclosure can be implemented in an embodiment in which various changes and improvements are made based on the knowledge of those skilled in the art without departing from the spirit thereof.

In-wheel motor driving device according to the present disclosure, to reduce the amount of deformation of the motor case and the reduction gear case, by suppressing the force in the direction of separating the mating surfaces of each other acts, between the mating surfaces of each other an effect that it is possible to improve the sealing property.

According to an embodiment, the in-wheel motor driving device according to the present disclosure, to reduce the amount of deformation of the motor case and the reduction gear case, by suppressing the force in the direction of separating the mating surfaces from each other acts, between the mating surfaces of each other it is possible to improve the sealing property.

According to an embodiment, it is possible to improve the sealing property against external factors other than the deformation of the case.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An in-wheel motor drive device comprising:
    a motor case housing a motor provided in a drive wheel;
    a reduction gear case housing a reduction gear for decelerating a rotation of the motor and outputting the decelerated rotation from an output shaft to the drive wheel; and
    a plurality of fastening bolts for fastening the motor case and the reduction gear case in a state where a mating surface of the motor case and a mating surface of the reduction gear case are combined,
    wherein among the plurality of fastening bolts, a pair of fastening bolts facing each other across a stator coil end portion of the motor is arranged on a same straight line in a radial direction orthogonal to an axis direction of the motor, and
    wherein a sealing material is provided between the mating surface of the motor case and the mating surface of the reduction gear case and on an inner side of one of the pair of fastening bolts in the radial direction, the one of the pair of fastening bolts being provided on an inner side of the stator coil end portion in the radial direction.

* * * * *